US008595347B2

(12) United States Patent
Chari et al.

(10) Patent No.: US 8,595,347 B2
(45) Date of Patent: Nov. 26, 2013

(54) METHOD AND APPARATUS FOR DEVICE BASED POLICY CONFIGURATION IN A NETWORK

(75) Inventors: Srikumar Chari, Cupertino, CA (US); Jason Yansheng Jiang, Fremont, CA (US); Yongming Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2079 days.

(21) Appl. No.: 10/957,374

(22) Filed: Sep. 30, 2004

(65) Prior Publication Data

US 2006/0072456 A1 Apr. 6, 2006

(51) Int. Cl.
*G06F 15/173* (2006.01)
(52) U.S. Cl.
USPC ............................................. 709/224
(58) Field of Classification Search
USPC ............................................. 709/224
See application file for complete search history.

(56) References Cited

U.S. PATENT DOCUMENTS

| 6,826,698 | B1 * | 11/2004 | Minkin et al. | 726/1 |
| 2005/0022027 | A1 * | 1/2005 | Bonn et al. | 713/201 |
| 2006/0041936 | A1 * | 2/2006 | Anderson et al. | 726/11 |

OTHER PUBLICATIONS

Release Notes for Security Device Manager, Version 1.1, 26 pages, Copyright 2003-2004 Cisco Systems.

* cited by examiner

*Primary Examiner* — William Goodchild
(74) *Attorney, Agent, or Firm* — Fish & Richardson P.C.

(57) ABSTRACT

A method and apparatus for configuring and managing policy configuration associated with a plurality of interfaces of a plurality of devices in a network are provided. This method is executable in a processing system. The processing system includes a processor coupled to a display and user input device. The method comprises displaying an icon corresponding to a device in the network, a plurality of interface indicia associated with traffic flow through the device policy-related information of devices in a network, and, a pair of traffic indicia that indicate a direction of traffic flow with respect to the plurality of interface indicia and the icon. A signal is then accepted from the user input device to indicate selection of an interface indicium. Finally, the policy information of an interface associated with the interface indicium is displayed in accordance with a direction of traffic flow in response to the signal from the user input device.

32 Claims, 13 Drawing Sheets

METHOD AND APPARATUS FOR DEVICE BASED POLICY CONFIGURATION IN A NETWORK

BACKGROUND OF THE INVENTION

1. Field of Invention

This invention relates in general to the configuration and management of devices in a network. More specifically, the invention relates to methods and systems for device based policy configuration in a network.

2. Description of the Background Art

A network generally includes a large number of devices. These devices can be switches and routers for facilitating traffic, or user-end stations such as PCs, printers, servers, fax machines, hosts, workstations, and other user devices. A device belonging to the network may contain resources such as data, applications, software or hardware configurations, or any other source of information. The movement of resources from a source device to a destination device constitutes network traffic or traffic. The traffic enters or exits a device via interfaces.

An interface is a boundary across which two independent systems of devices communicate with each other. An interface can be physical or logical. A physical interface is provided by hardware of a device, whereas, a logical interface can be implemented by using a software. Both physical and logical interfaces are preferably configured for directing traffic in or out of the device.

The traffic across devices and interfaces is controlled by defining specific policies that may be applicable to these devices and interfaces. A policy includes a set of rules for allowing or disallowing a particular traffic by a specific user or groups of users under specific conditions. There are different types of policies, each of which is used to control network traffic in a specific way. For example, an Access Control List (ACL) is used for filtering (allowing or denying) traffic, whereas, a QoS policy is used for defining traffic priorities and queuing. A policy is applied to interfaces of a device in a specific direction. Sometimes, multiple instances of a particular policy may be applied to several interfaces of a device in different directions.

A policy may contain multiple rules, each of which is applicable to an interface or in a specific direction. The rules can either be of the same or different type. For example, a firewall policy usually contains three rules, one of which is a CBAC (Context Based Access Control) rule and the other two are ACLs. To make a policy effective, all the rules contained in the policy must be applied to their associated interfaces or directions, more specifically to an interface's inbound or outbound direction. There could be different policies as well. These different policies may be applicable to the traffic for a user or a device under a specific set of operational conditions.

An example policy could be a set of policies applicable to integrated security devices, such as Cisco's integrated security routers. These security devices combine traditional device functionality with security features, e.g., firewall, virtual private network (VPN), intrusion detection system (IDS), and intrusion prevention system (IPS). Since these devices require more knowledge and skill to correctly configure all policies while ensuring compatibility, configuring them in a network is complex. However, as these devices are becoming cheaper, novice users are increasingly configuring these devices themselves. The complexity of the network configuration implies that the novice users require assistance in the form of a security device management mechanism for policy configuration of integrated security devices.

One such policy management and configuration mechanism provides network topology diagrams to facilitate configuration of various devices in a network. Network topology diagrams are commonly provided in network-based management applications. Such applications include the Cisco Secure Policy Manager (CSPM) and Cisco Configmaker. A network-based management application includes the information of neighboring devices to help the user to configure a specific device. However, with respect to device management application, there are one or more of the following limitations.

Firstly, a device management application that is responsible for managing a single device in a network does not include information of the neighboring devices. Therefore, a network topology diagram cannot be provided in a device management application.

Secondly, device management applications display the rules corresponding to a policy in tabular forms. However, it is difficult to display a policy in a tabular form as it may include multiple rules of different type. Also, a rule may include one or more rule entries. The rule entries are displayed as a list. Since each rule may have its own parameters and settings, it is not possible to display different rules in the same table with common columns. A single table may not be able to present all the information to users. Therefore, this method is applicable only to simple devices or security applications, which usually require configuration of a policy with a single rule. Rules of different type may be displayed in different windows. Each window can only display rules of a specific type in a tabular form. To display a policy, a user may need to look into several windows. However, common rules and incompatibilities between different policies are not effectively displayed. Consequently, there is no easy way to depict policy/rules in association with interfaces/directions. Further, the user may fail to receive warnings in case the policies have not been configured properly. The user may not be able to understand the complete listed information easily. Therefore, this method cannot be effectively applied to management of integrated security devices. This is because these devices have complex features, which require configuration of multiple policies and rules on interfaces and directions.

SUMMARY OF EMBODIMENTS OF THE INVENTION

In one embodiment, the invention provides a method for configuring and managing policies associated with a plurality of interfaces of a device in a network. The managing may include configuring policies associated with the device. The method is implemented in a processing system, which includes a processor coupled with a display unit and a user input device. This method comprises the display of: an icon corresponding to a device of the network on the display unit, a plurality of interface indicia associated with the traffic flow through the device, a pair of traffic indicia that indicates the direction of the traffic flow with respect to the plurality of interface indicia, the icon and policy information of an interface associated with an interface indicium in accordance with a direction of traffic flow. This direction of traffic flow is selected in response to a signal from the user input device. It also comprises the acceptance of a signal from the user input device to indicate selection of the interface indicium.

In another embodiment, the invention provides a user interface for configuring and managing policies associated with a plurality of interfaces associated with a device in a network. The user interface resides in a processing system including a processor coupled to a display and a user input device. The user interface comprises a policy diagram, a policy controller, and a policy table. The policy diagram displays an icon corresponding to a device in the network, a plurality of interface indicia associated with traffic flow through the device, and a traffic indicia that indicates a direction of traffic flow with respect to the plurality of interface indicia and the icon. The policy controller accepts a signal from the user input device to indicate the selection of an interface indicium. It also coordinates the synchronization of policy table and policy diagram, their display sequence and update sequence. The policy table displays policy information of an interface associated with the selected interface indicium, in accordance with a direction of traffic flow in response to the signal from the user input device.

In yet another embodiment, the invention provides an apparatus for configuring and managing policies associated with a plurality of interfaces associated with a device in a network. The apparatus comprises a processor and a machine-readable medium, including one or more of the following instruction means executable by the processor: (i) one or more instructions for displaying an icon on the display unit, wherein the icon corresponds to a device in the network; (ii) one or more instructions for displaying a plurality of interface indicia associated with the traffic flowing ('From' interface to 'To' interface and vice-versa) through the device; (iii) one or more instructions for displaying a traffic indicia that indicates a direction of traffic flow with respect to the plurality of interface indicia and the icon; (iv) one or more instructions for accepting a signal from the user input device to indicate selection of an interface indicium; and one or more instructions for displaying policy information of an interface that is associated with the interface indicium, in accordance with the direction of traffic flow, and in response to the signal from the user input device. Additional embodiments of the present invention provide a machine-readable medium, including one or more of the foregoing instructions executable by the processor.

In further embodiments of the present invention, a method is provided for creating and configuring policy information associated with multiple interfaces of a device in a network. The method may be executed or conducted in a processing system including a processor coupled to a display and user input device. The method comprises displaying an icon on the display wherein the icon corresponds to the device in the network, displaying a first interface indicia associated with traffic flow through the device, displaying a second interface indicia associated with traffic flow through the device, displaying a traffic indicia that indicates a direction of traffic flow with respect to the first and second interface indicia and to the icon, accepting a signal from the user input device to indicate selection of an interface indicia, and, in response to the signal from the user input device, displaying policy information of an interface associated with an interface indicia in accordance with a direction of traffic flow. The method may additionally comprise selecting the first interface indicia as the ingress of a traffic flow, selecting the second interface indicia as the egress of the traffic flow, applying policy information as ingress at the first interface indicia, and applying policy information as egress at the second interface indicia. The method may further additionally comprise altering the flow of traffic, such as by swapping the first interface indicia for the second interface indicia. The traffic indicia may include first and second traffic indicia, wherein the first traffic indicia indicates a traffic flow in a first direction with respect to the first and second interface indicia and to the icon, and wherein the second traffic indicia indicates a traffic flow in a different direction from the first direction.

These provisions, together with the various ancillary provisions and features that will become apparent to those artisans who possess skill in the art, as the following description proceeds, are attained by devices, assemblies, systems, and methods of embodiments of the present invention, various embodiments thereof being shown with reference to the accompanying drawings, by way of example only, wherein:

DETAILED DESCRIPTION OF EMBODIMENTS OF THE INVENTION

Embodiments of the invention provide a method, a system, and a computer program product for configuring and managing policies associated with a plurality of interfaces of a device in a network. A policy can include one or more rules for controlling traffic in a network. Each rule of a policy is associated with an interface in a specific direction (i.e., inbound or outbound). The rules of a policy may be of same or different type for controlling different aspects of network traffic. A rule includes a list of rule entries. For example, access control list (ACL) rule of firewall policy includes a list of access control entries (ACEs).

The system comprises a processing system that includes a display unit, a user input device and a user interface. The method and system allows the display of an icon corresponding to a device in the network, a plurality of interface indicia corresponding to a plurality of interfaces in the network, and a pair of traffic indicia corresponding to a selected direction of traffic flow through the device and the interfaces. Subsequently, a rule, associated with the interfaces, corresponding to the policy for the device in the selected direction of traffic flow is displayed. The selection and display is carried out by using the user interface, which resides in the processing system. The user interface interacts with the user input device and the display unit for enabling the selection and display of the device, interfaces, traffic flow direction, and associated rules of the policy.

Figure 1:
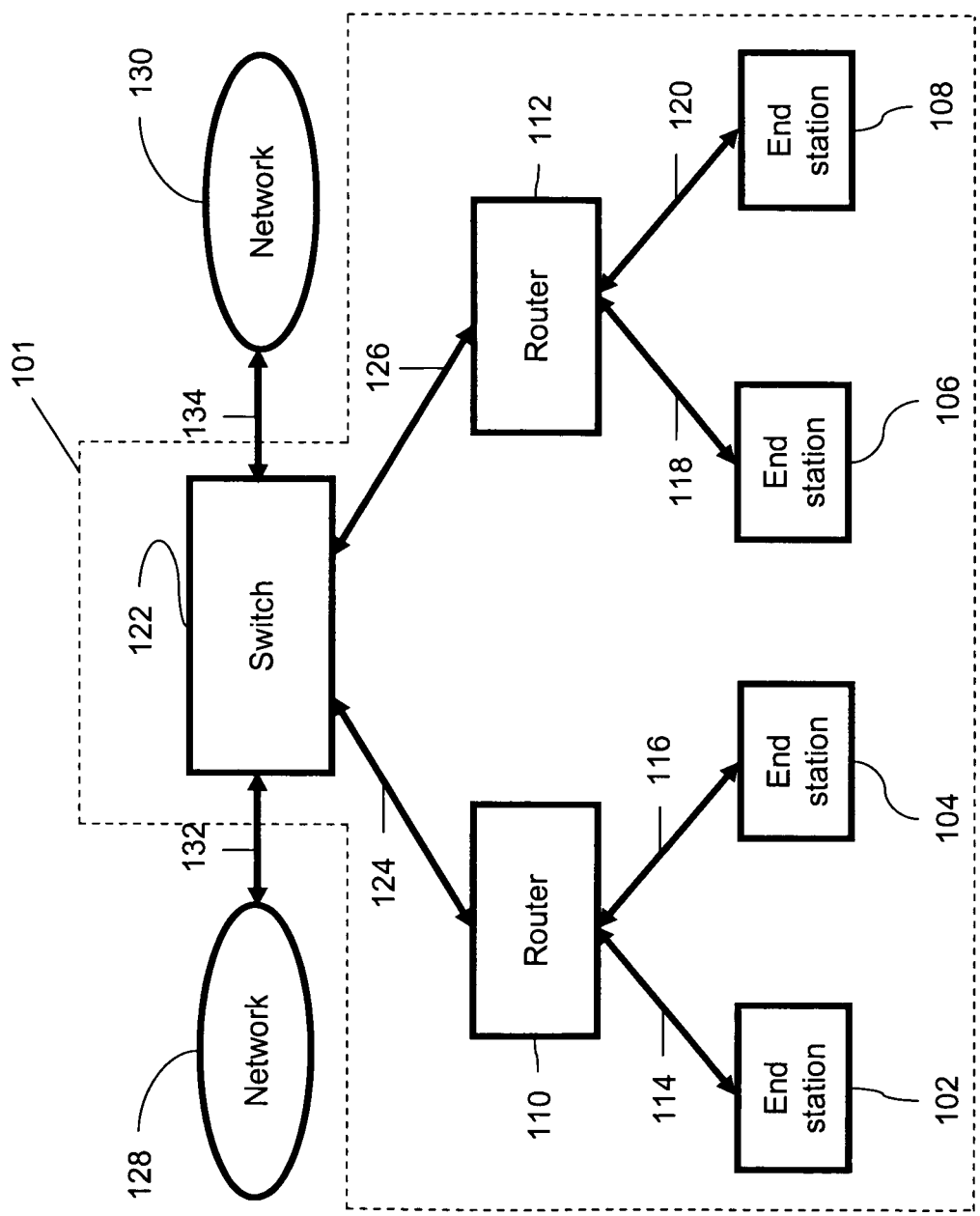
FIG. 1 illustrates an exemplary network of devices suitable for use, in accordance with an exemplary embodiment of the present invention.

FIG. 1 illustrates an exemplary network of devices suitable for use with the present invention. In general, any device or network of devices, which is a source and/or destination of network traffic, is suitable for use with the embodiments of the present invention. For example, a network of devices can be Internet, corporate or campus network; home or small network; local area network (LAN); metropolitan area network; etc. The network devices include, but are not limited to, switches and routers for facilitating traffic, end stations such as PCs, printers, servers, fax machines, storage systems, hosts, and workstations. For the sake of simplicity, only a few devices are shown FIG. 1. In general, the number of devices may be much higher.

FIG. 1 depicts a first network 101 comprising end stations 102, 104, 106, and 108 connected to a pair of routers 110 and 112 through communication channels, hereinafter referred as channels, 114, 116, 118, and 120. Routers 110 and 112 are connected to a switch 122 through channels 124 and 126, respectively. Switch 122 communicates with a second network 128 and a third network 130 through channels 132 and 134, respectively. Second network 128 and third network 130 can be LAN, Internet, or any other suitable network. The channels shown in FIG. 1 are responsible for network traffic or traffic across the devices of networks 101, 128, and 130.

The traffic between the devices flows through interfaces; these interfaces have not been explicitly shown in FIG. 1. The traffic between the devices is controlled by using policies corresponding to a network feature associated with the devices and interfaces. An exemplary network feature includes a network security feature in the form of a firewall that can be enforced through routers of the exemplary network of FIG. 1. The network feature may be configured on routers 110 and 112 in the form of commands in running configuration and implemented as policies applicable to interfaces of the devices and the corresponding traffic between them. Each router has at least two configured interfaces. As an example, a policy for the traffic between end stations 102 and 104 may be enforced through router 110.

Figure 2:
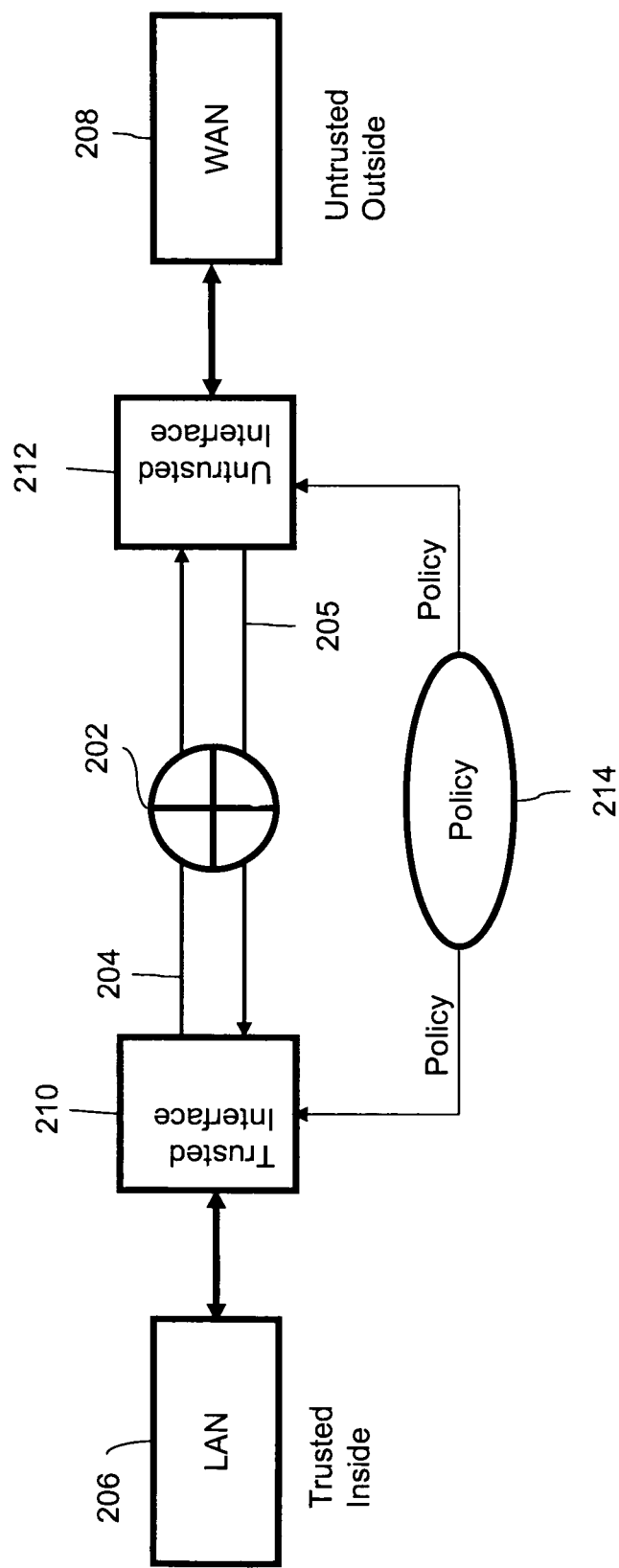
FIG. 2 illustrates a router for controlling traffic between a pair of networks, in accordance with an exemplary embodiment of the present invention.

FIG. 2 illustrates a router 202 for controlling traffic 204 and 205 between a pair of networks—a local area network (LAN) 206 and a wide area network (WAN) 208. Traffic 204 is directed from LAN 206 to WAN 208 and traffic 205 is directed to LAN 206 from WAN 208. A pair of interfaces, herein referred to as a trusted interface 210 and an untrusted interface 212, facilitates traffics 204 and 205 between LAN 206 and WAN 208. Traffic 204 is directed from trusted interface 210 to untrusted interface 212, whereas, traffic 205 is directed to trusted interface 210 from untrusted interface 212. A policy 214 such as a firewall policy is installed on router 202. Policy 214 is applicable to interfaces 210 and 212; and traffic 204 and 205 between interfaces 210 and 212. A policy can be configured by a user and applied to interfaces 210 and 212. This affects the traffic between 210 and 212. Further, rules of the policy are applied to each of the interfaces in a specified direction. For configuring a policy, the user may be provided with a user interface to guide him through the policy configuration. According to an embodiment of the present invention, one such user interface may be implemented by using a method shown in FIG. 3.

Figure 3:
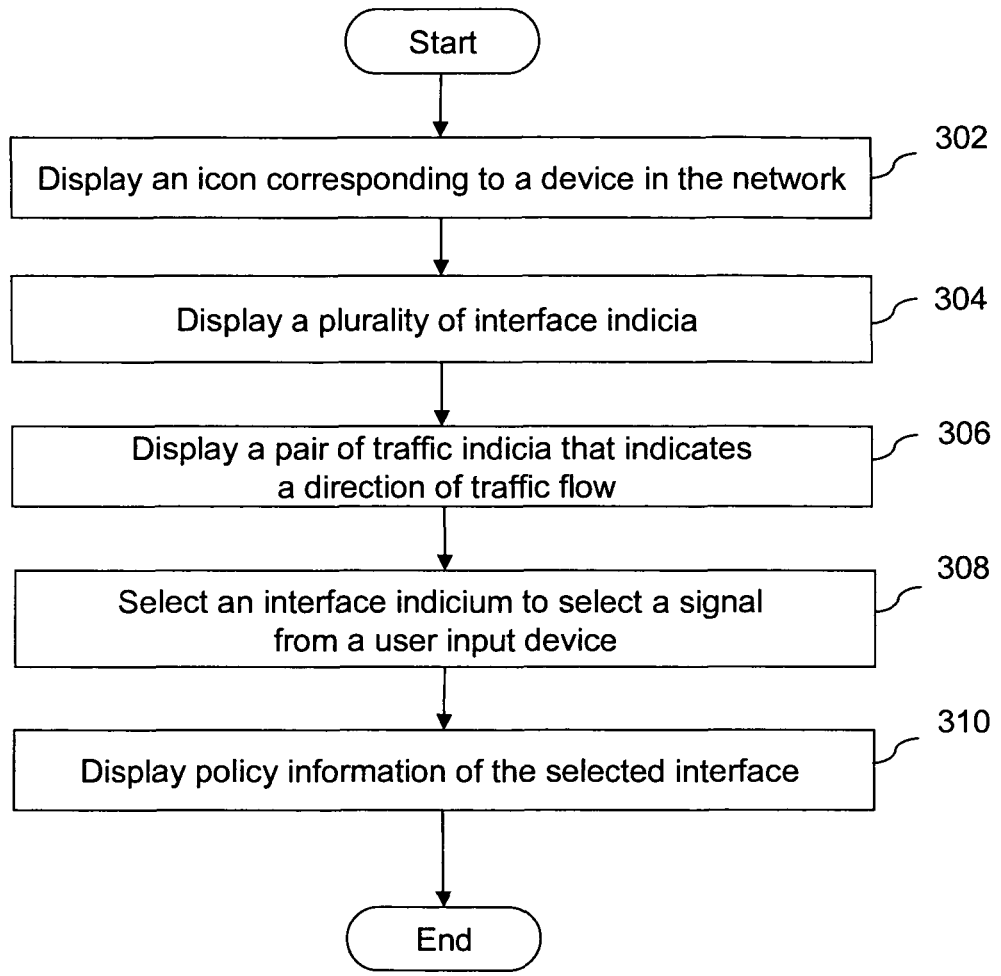
FIG. 3 is a flowchart of a method for managing policy configuration associated with interfaces of devices in a network, in accordance with an exemplary embodiment of the present invention.

FIG. 3 is a flowchart of the method for managing policy configuration associated with the interfaces of devices in a network, according to an exemplary embodiment of the present invention. The method is executable in a user interface residing in a processing system that includes a processor coupled with a display unit and a user input device. An icon corresponding to a device in the network is displayed at step 302. In an exemplary embodiment of the invention, the icon represents a router and is referred to as a router icon. A plurality of interface indicia associated with traffic flow through the device is displayed at step 304. A pair of traffic indicia that indicates a direction of traffic flow with respect to the plurality of interface indicia and the icon is displayed at 306. At 308, an interface indicium is selected by selecting a signal from the user input device. The policy information of the selected interface indicium in the direction of traffic flow is then displayed at 310.

The user interface for implementing the above-described method depicts the traffic relationships such as the relation between the source of the traffic and the destination of the traffic, and the type of services offered by the traffic. The user interface also represents the relationship between the interfaces, traffic directions, policies, and their associations in a two-dimensional or three-dimensional diagram. One such user interface is hereinafter described.

Figure 4A:
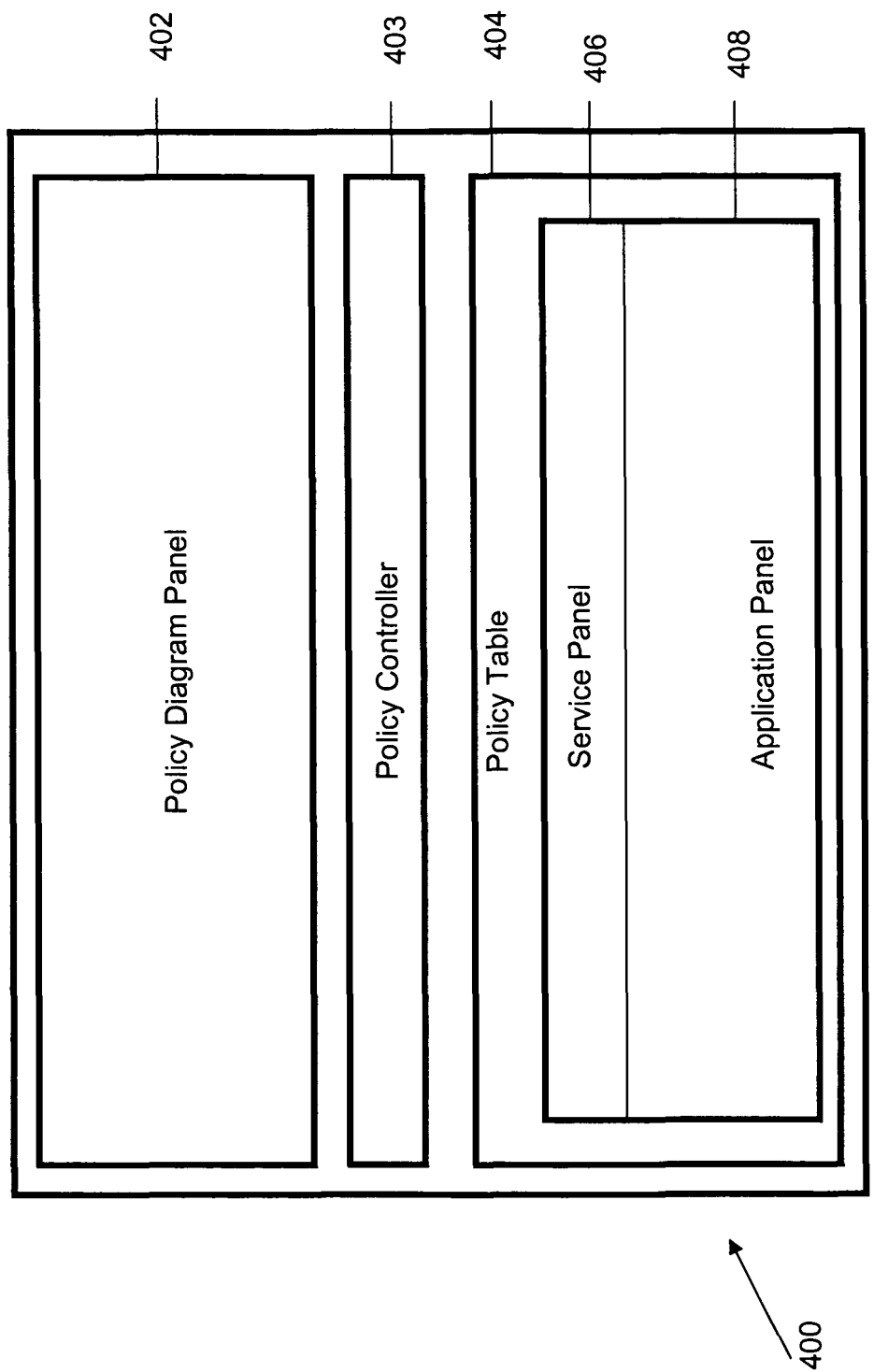
FIG. 4A illustrates an exemplary block diagram of a user interface, in accordance with an exemplary embodiment of the present invention.

FIG. 4A illustrates an exemplary block diagram of a user interface 400 based on the method described above. User interface 400 comprises a policy diagram panel 402, a policy controller 403, and a policy table 404. Policy table 404 comprises a service panel 406 and an application panel 408. Policy diagram panel 402 and policy table 404 are displayed to a user while policy controller 403 is not displayed to a user. According to an embodiment of the present invention, user interface 400 can include multiple policies. For example, user interface 400 can include policies such as firewall policy, network address translation (NAT) policy, virtual private network (VPN) policy, and, intrusion protection system (IPS) policy.

Figure 4B:
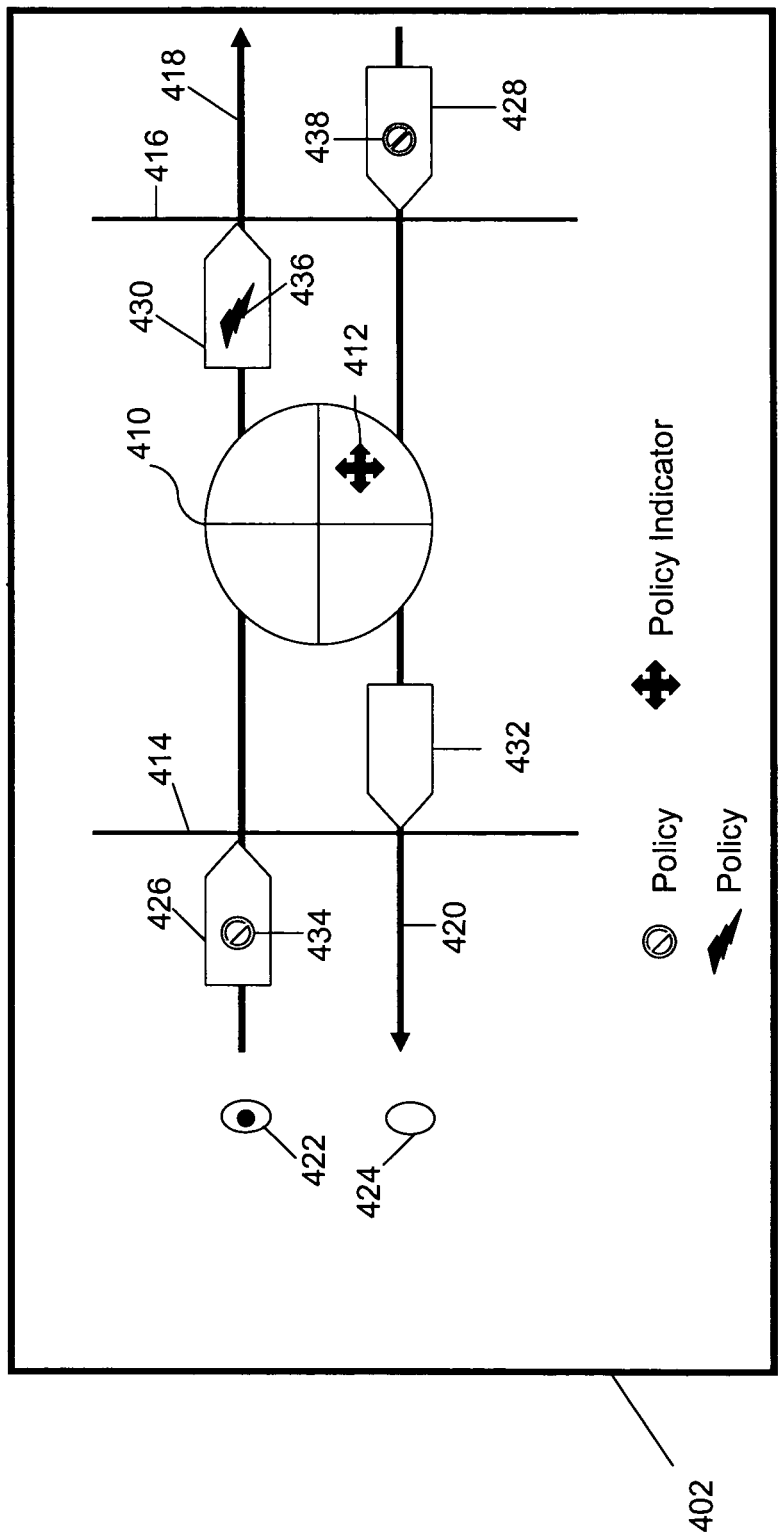
FIG. 4B illustrates a policy diagram panel, in accordance with an exemplary embodiment of the invention.

FIG. 4B illustrates policy diagram panel 402, according to an exemplary embodiment of the invention. For the sake of simplicity, only a pair of interface indicia is shown in FIG. 4B. In general, the number of interface indicia associated with traffic that flows through the interfaces of the device and the corresponding interfaces, can be much higher. In an exemplary embodiment of the present invention, a pair of interface indicia may be associated with a number of interfaces of the device, such that one of the interface indicia corresponds to the interfaces that are ingress of traffic flow to the device, and the other corresponds to the interfaces that are egress of traffic flow to the device.

Policy diagram panel 402 displays an icon 410 corresponding to a device in the network, a pair of interface indicia 414 and 416 associated with traffic that flows through the two interfaces of the device, and a pair of traffic indicia 418 and 420 that indicates the direction of traffic flow with respect to pair of interface indicia 414 and 416 and icon 410. In various embodiments, icon 410 can correspond to a router device in the network. Icon 410 includes a policy indicator 412 corresponding to a policy such as a firewall. The presence of policy indicator 412 on icon 410 indicates that the corresponding policy (for example the firewall policy) is active. Interface indicia 414 and 416 represent interfaces of the device corresponding to icon 410. Interface indicium 414 represents the first interface and interface indicium 416 represents the second interface. Interface indicia 414 and 416 are hereinafter referred to as interfaces 414 and 416. Interface 414 is defined as the 'From' interface and is ingress of the traffic flow to icon 410. Interface 416 is defined as the 'To' interface and is egress of the traffic flow from the device represented by icon 410. The traffic that ingresses the 'From' interface and egresses the 'To' interface is the originating traffic. Similarly, the traffic that ingresses the 'To' interface and egresses the 'From' interface is the returning traffic. In an embodiment of the present invention, referring back to FIG. 2, an exemplary originating traffic can be directed from LAN 206 through trusted interface 210 towards router 202, whereas an exemplary returning traffic can be directed from WAN 208 through untrusted interface 212 towards router 202.

A pair of traffic indicia 418 and 420 indicate a direction of traffic flow with respect to interfaces 414 and 416 and icon 410. Each traffic indicium is indicated by an arrow to signify the direction of traffic between interfaces 414 and 416. Traffic indicium 418 is the first traffic indicium that indicates a traffic flow of the originating traffic. Traffic indicium 420 is the second traffic indicium that indicates a traffic flow of the returning traffic. One of traffic indicia 418 or 420 can be selected by clicking buttons 422 or 424. The selected traffic indicium represents an active traffic flow. The other traffic indicium represents an inactive traffic flow. The active traffic indicium visually differs from the inactive traffic indicium thereby ensuring that policy diagram panel 402 highlights only the policies applicable to a specific direction of traffic, at a time. For example, when button 422 is clicked as shown in FIG. 4B, the originating traffic corresponding to traffic indicium 418 becomes active and is represented in a color that is different from the color representing inactive traffic indicium 420. Traffic indicia 418 and 420 cross interfaces 414 and 416 indicating that the traffic passes through the interfaces.

According to an embodiment of the present invention, traffic indicia 418 and 420 may be swapped by a user, to set the active traffic flow. This may be achieved by clicking buttons 422 or 424. For example, when button 424 is clicked, the returning traffic corresponding to traffic indicium 420 becomes active. In this case, interface 416 becomes the first or 'From' interface and is ingress of traffic flow to icon 410. Also, interface 414 becomes the second or 'To' interface and is egress of traffic flow from icon 410.

According to an embodiment of the present invention, the policy diagram in policy diagram panel 402 displays the policy information of an interface in accordance with the direction of traffic flow. The policy information relates to the configuration of interfaces, and the application of policies such as Context-Based Access Control (CBAC) to the traffic flow through the interfaces. Policy information also includes displaying an icon for each rule of a policy applied at the interfaces. According to another embodiment of the present invention, a policy is applied when the traffic flow reaches interface ingress of the traffic flow to icon 410 or when the traffic flow reaches an interface egress of the traffic flow from icon 410. This implies that for any specified traffic flow, rules of a policy are applied when the traffic flow just enters the 'From' interface, i.e., interface 414 or after it just exits the 'To' interface, i.e., interface 416. Application of a policy may involve applying several rules to 'From' and 'To' interfaces. The traffic that enters a device through an interface is called inbound traffic; the traffic that exits a device through an interface is called outbound traffic. For example in FIG. 4B, the traffic directed towards the 'From' interface is called inbound traffic, whereas the traffic directed away from the 'To' interface is called outbound traffic. Preferably, when inbound and outbound traffic is reference, it is liked to a specific interface. Both "To" and "From" interfaces have outbound traffic and inbound traffic.

In FIG. 4B, the policies can be applied only at fields 426 and 428 for inbound traffic and only at fields 430 and 432 for outbound traffic. A policy icon 434 represents a rule of the policy applicable on the inbound traffic. Similarly, a policy icon 436 represents a rule of the policy applicable on the outbound traffic. In general, a rule corresponding to a policy can be applied to inbound direction or outbound direction or both of an interface. For example, for configuring a firewall policy, Access Control List (ACL) and CBAC rules can be applied at fields 426 or 430 for the originating traffic, and an ACL can be applied at field 428 to deny the traffic to be inspected. Multiple rules can be applied to the inbound traffic and/or the outbound traffic at 'From' and 'To' interfaces.

According to an embodiment of the present invention, rules applicable to the 'From/Inbound' and 'To/Outbound', or 'To/Inbound' and 'From/Outbound' may be different or identical. According to another embodiment of the present invention, multiple policies may be applicable to the inbound traffic or the outbound traffic. In such a case, all the policy icons corresponding to the applicable policies are shown. The policy icons corresponding to rules of a policy for the active traffic are visually different from the policy icons corresponding to rules of a policy for the inactive traffic. For example, policy icons 434 and 436 are represented by using different symbols in a different color than that of a policy icon 438. When no rule of a policy is applicable, no policy icon is shown. For example, when no rule of a policy is applied to the outbound traffic, field 432 may not be shown in policy diagram panel 402.

According to an embodiment of the present invention, policy diagram panel 402 can include multiple layers such that each layer displays a policy of a specific type applied to the selected interfaces. For example, a policy diagram panel with three layers can have a first layer for network address translation (NAT) policy, a second layer for firewall policy and a third layer for virtual private network (VPN) policy.

Referring back to FIG. 4A, policy controller 403 (not shown in FIG. 4B) accepts a signal from the user input device to indicate the selection of a pair of interfaces ('From' and 'To'). Policy controller 403 identifies the policies that are applied at the interfaces and coordinates the functions and activities between the components of user interface 400. Policy controller 403 is also responsible for coordinating the display, updating various panels of user interface 400 and synchronizing policy content update among the various panels, i.e., policy diagram panel 402 and policy table 404. Policy controller 403 resides in the processing system in the form of a program code. Policy table 404 displays the policy information of the selected pair of interfaces (i.e., 'From' and 'To'), in accordance with a direction of traffic flow. This direction of traffic flow is selected in response to the signal from the user input device.

Policy table 404 comprises service panel 406 and application panel 408. Service panel 406 displays policy information of the policies that policy controller 403 identifies. Service panel 406 also displays whether a particular traffic flow through an interface is allowed or denied. In an embodiment, service panel displays rules relating to ACL. Service panel 406 makes use of the following conditions for displaying the rules of a policy: If there is only one rule in a specified direction, it is displayed. If there are two rules in a specified direction, the rule for the inbound traffic is displayed initially. This implies that the rules for the inbound traffic flow are given a higher priority than the rules for the outbound traffic flow. However, the user can alter this display preference depending on his requirements, according to an embodiment of the present invention. The display preference can be changed by making a selection from a dropdown list, in the form of a toolbar. In an embodiment of the present invention, this dropdown list is located just above the service panel 406. Service panel 406 also displays a warning icon to the user indicating an incompatible configuration in a policy.

Application panel 408 displays rules corresponding to a policy applied at the interface. The rules displayed by service panel 406 are different from rules displayed by application panel 408. In an embodiment of the present invention, application panel 408 displays a CBAC rule applied to either 'From/In' or 'To/Out'. The rules displayed by application panel 408 and service panel 406, for example ACL and CBAC, when applied to 'From' and 'To' interfaces make a policy such as firewall policy work.

Policy table 404 displays a warning message if the rules corresponding to a selected policy are not supported by user interface 400. Policy table 404 also displays a warning message when a policy applied at the 'From' interface is not compatible with a policy applied at the 'To' interface.

According to an embodiment of the present invention, user interface 400 shown in FIG. 4A may also include a traffic selection panel (not shown in FIG. 4A). The traffic selection panel enables a user to select the pair of interfaces 414 and 416 displayed in policy diagram panel 402. According to another embodiment of the invention, the traffic selection panel allows a user to preview the details of a selected interface.

Figure 5:
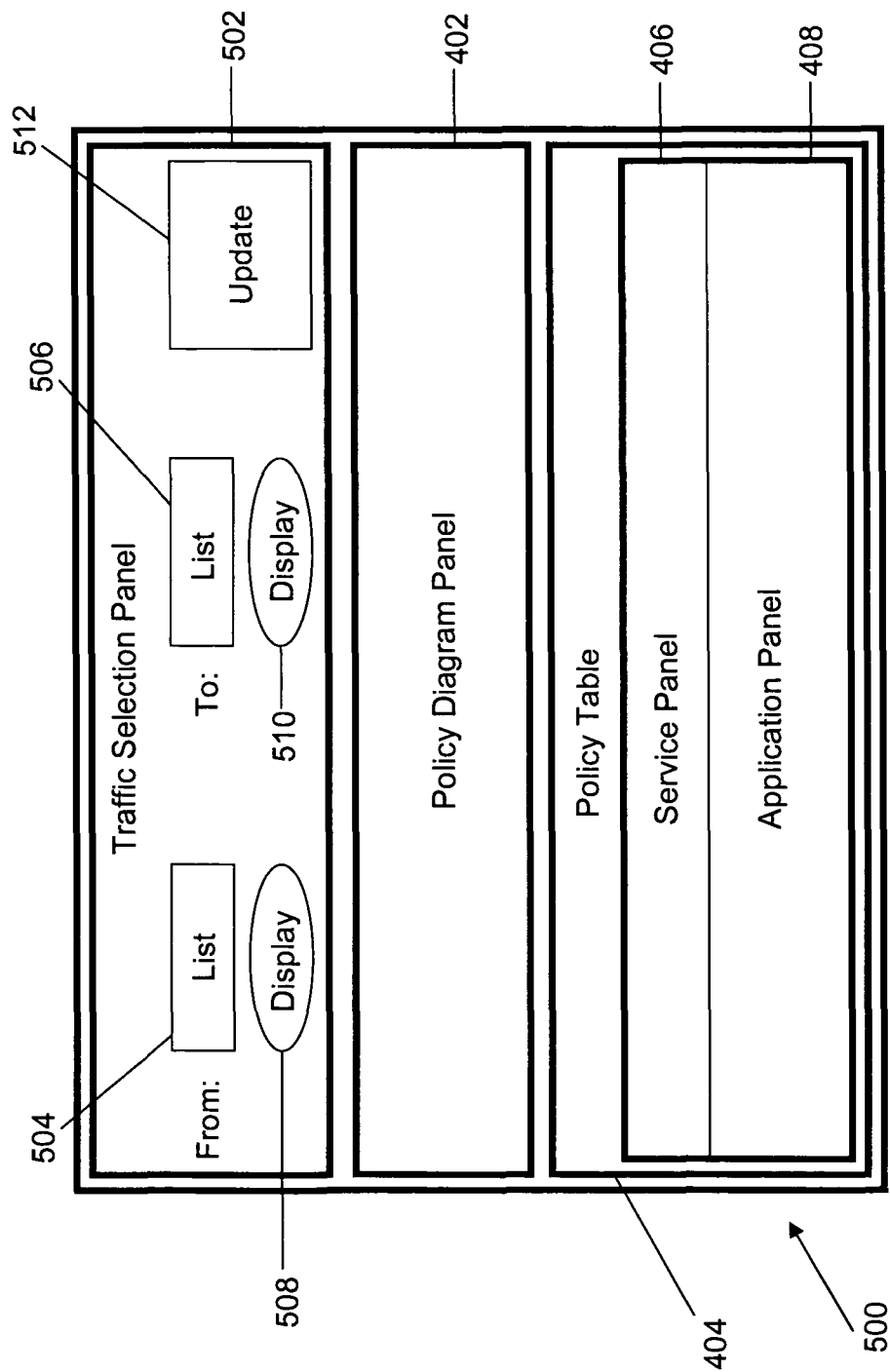
FIG. 5 illustrates a block diagram of a user interface, in accordance with another embodiment of the present invention.

FIG. 5 illustrates a block diagram of a user interface 500 comprising a traffic selection panel 502, policy diagram panel 402, and policy table 404. Policy table 404 includes service panel 406 and application panel 408.

Traffic selection panel 502 is used to select a pair of interfaces. Once the interfaces are selected they are displayed in policy diagram panel 402. As described earlier in conjunction with FIG. 4A and 4B, the pair of traffic indicia of policy diagram panel 402 indicate the direction of traffic flow. The two interfaces are selected from two different lists of interfaces. The two lists are a list 504 and a list 506 of traffic selection panel 502. According to an embodiment of the present invention, the contents of the two lists can be the same. According to another embodiment of the present invention, the two interfaces may also be selected from a single list provided they are different from each other. This implies that at least two interfaces are included in this list. One of the selected interface is the 'From' interface and the other interface is the 'To' interface. For example, the interface selected from list 504 is the 'From' interface and the interface selected from list 506 is the 'To' interface.

There are two display icons 508 and 510 in traffic selection panel 502. Display icon 508 enables display of detailed information of the interface selected from list 504. Display icon 510 enables display of detailed information of the interface selected from list 506. The detailed information of the interface includes, but is not limited to, the services, protocols, and applications associated with the interface. Traffic selection panel 502 also includes a command button 512 that allows the user to update the policy diagram of policy diagram panel 402, according to the selected pair of interfaces and the direction of traffic between them. The direction of traffic flow can be specified by selecting buttons 422 or 424 in policy diagram panel 402 shown in FIG. 4B.

Figure 6:
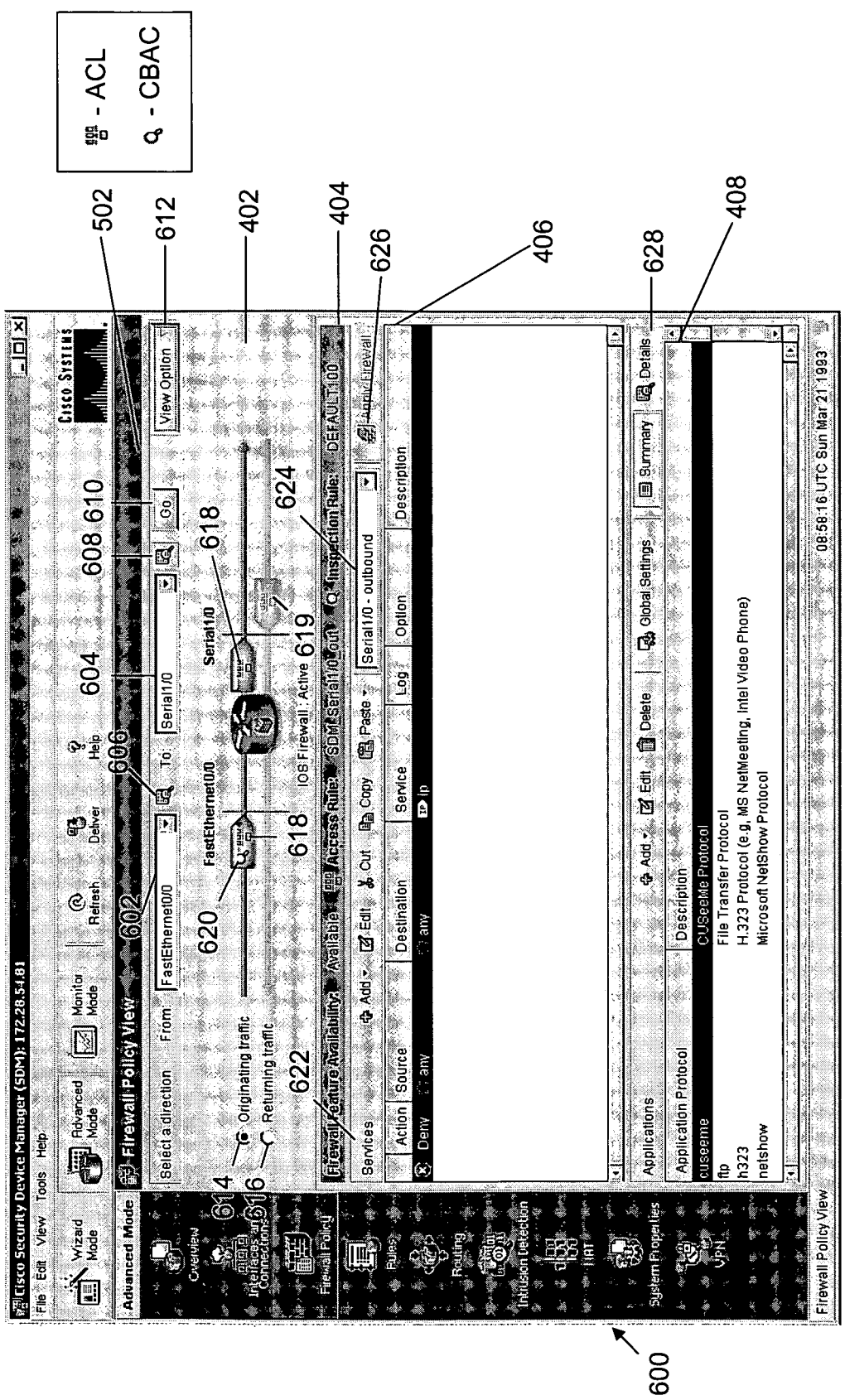
FIG. 6 illustrates an exemplary screenshot of the user interface illustrated in FIG. 5.

FIG. 6 illustrates an exemplary screenshot 600 of user interface 500 illustrated in FIG. 5. Screenshot 600 displays the configuration of the firewall security feature in the form of a firewall policy view (FPV). Firewall includes policy rules corresponding to Access Control List (ACL) and context-based access control (CBAC) inspection rules. Therefore, there can be four cases of possible combinations of rules of the firewall policy applicable at a specific interface in a specific direction. In the first case, no rule of the firewall policy is applied at an interface in a specific direction. In the second case, ACL is applied at an interface in a specific direction. In the third case, CBAC is applied at an interface in a specific direction, and lastly both ACL and CBAC are applied at an interface in a specific direction. Referring to FIG. 4B, the four cases of combinations of rules of the firewall policy mentioned above can be applied at four fields 426, 428, 430 and 432 in policy diagram panel 402. Hence, there can be 44 or 256 cases of policy combinations of rules of the firewall policy for an FPV. However, in an exemplary embodiment of the present invention, one or more policy icons may be applied at fields 426, 428, 430 or 432 in different directions. Also, each icon can be in active or passive state. As a result, in an exemplary embodiment, using only 12 policy icons provide for or cover the 256 cases of combinations of the rules of the firewall policy, that can arise.

Traffic selection panel 502 includes two drop-down lists 602 and 604 for selecting the 'From' and 'To' interfaces, respectively. In an embodiment of the present invention, the interfaces in the drop-down lists are arranged in, for example, an alphabetical order. If there are at least two interfaces in the list, the first interface is initially selected as 'From' and the second is selected as 'To' interface. Only those configured interfaces that can be addressed with the Internet protocol are listed in the 'From' and 'To' dropdown lists.

Figure 7:
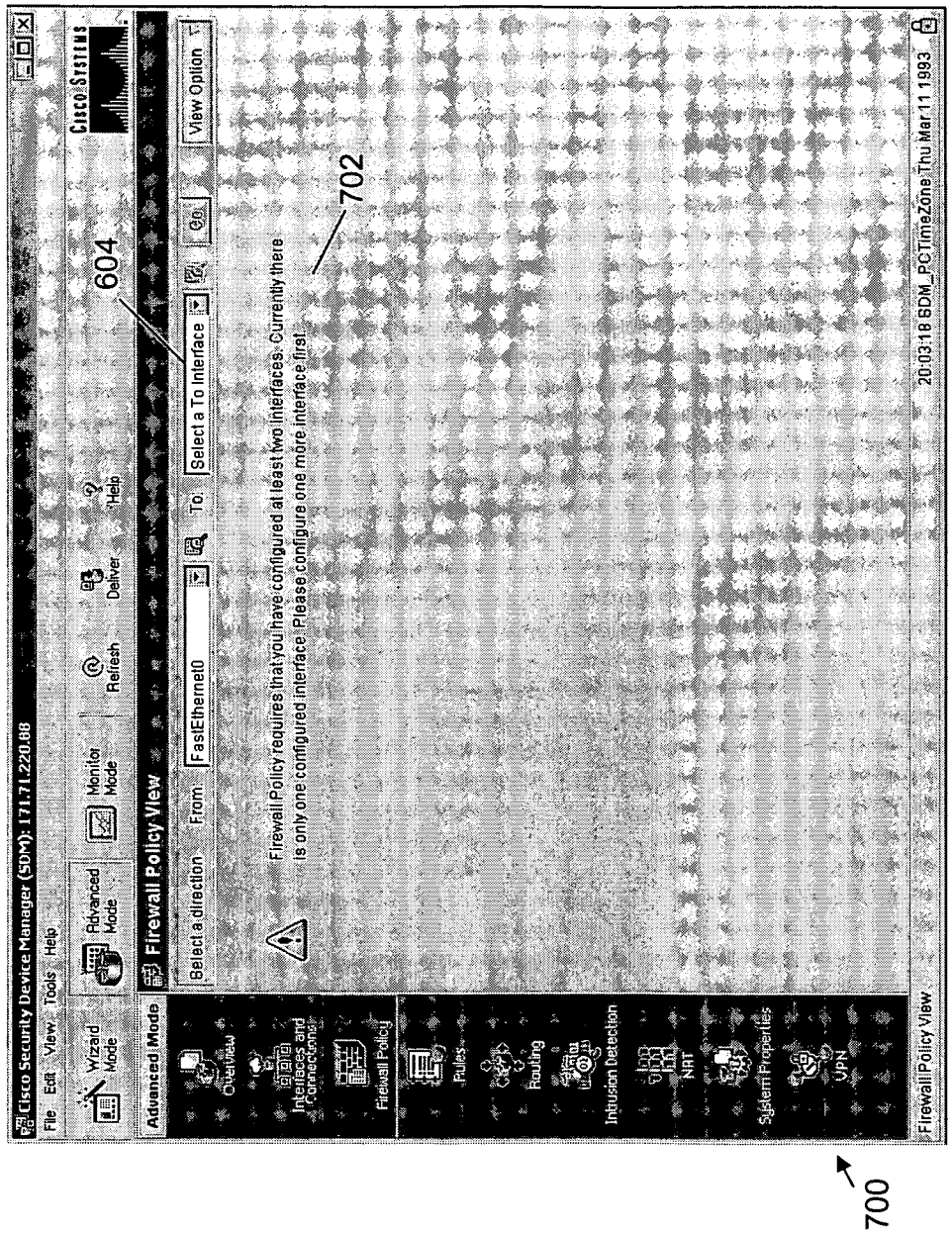
FIG. 7 illustrates the display of the user interface when only one interface is configured, in accordance with an exemplary embodiment of the present invention.

When clicked, a pair of buttons 606 and 608 displays the detailed information of the selected interfaces. This detailed information includes protocols, services and applications associated with the selected interfaces. A 'Go' button 610 is enabled when both 'From' and 'To' interfaces are selected, and the selected interfaces are not the same. The policy configuration of the selected interfaces is displayed when 'Go' button 610 is clicked. A 'View Options' button 612 is a popup menu button. It can be used to change the direction of traffic and view the existing policies on the traffic and interfaces. In an embodiment of the present invention, View Options menu button includes menu items such as 'Swap From and To Interface' and 'View all the ACLs in traffic flow'. In case there is only one configured interface, FPV may not be displayed. Instead, a message is displayed indicating the selection of only one interface. FIG. 7, which is described later, illustrates screenshot 600 when only one interface is configured.

Policy diagram panel 402 shows the policy diagram of the traffic flow defined in traffic selection panel 502. Policy diagram panel 402 includes a pair of buttons 614 and 616 for selecting the originating or returning traffic. Policy icons 618, 619 and 620 represent the rules of a policy, for example firewall policy. Policy icons 618 and 619 indicate, for example an ACL rule at an interface, while policy icon 620 indicates a CBAC rule at an interface. In an exemplary embodiment of the present invention, both the ACL and CBAC rules are applied at a 'From' interface in the inbound direction for the originating traffic. This is indicated by the presence of policy icons 618 and 620 together at the 'From' interface, for example "FastEthernet0/0" in the inbound direction. For returning traffic, policy icon 619 is inactive at the interface, for example "Serial1/0" in the inbound direction.

Policy table 404 includes service panel 406 and application panel 408. Service panel 406 displays contents of specific rules such as ACL. Service panel 406 includes a service panel toolbar 622. Service panel toolbar 622 enables the user to select an interface from among the two interfaces displayed in traffic selection panel 502 and policy diagram panel 402. The interface can be selected from a drop-down list 624. Drop-down list 624 consists of a list of two interfaces in specific directions of traffic. For example, drop-down list 624 may include the interfaces/directions: From/Inbound and To/Outbound when originating traffic is made active by selecting button 614, and, To/Inbound and From/Outbound when returning traffic is made active by selecting button 616. Clicking on button 626 allows a user to apply a policy such as firewall policy with a single click, if firewall has not been applied already. Button 626 is disabled when the Firewall has already been applied to the interface, or when the traffic is returning traffic with respect to the interface. Service panel toolbar 622 also includes buttons for viewing, creating, modifying, deleting, arranging the order of rule entries, and in general managing policies.

Service panel 406 specifies which traffic is allowed or denied. Service panel 406 displays contents of a rule of a policy. For example in FIG. 6, service panel 406 displays the contents of the ACL rule applied at the interface "Serial1/0" in the inbound direction. The interface/direction is selected from dropdown list 624. Also, the user can change display preference (described earlier) by making a selection from dropdown list 624.

Figure 8:
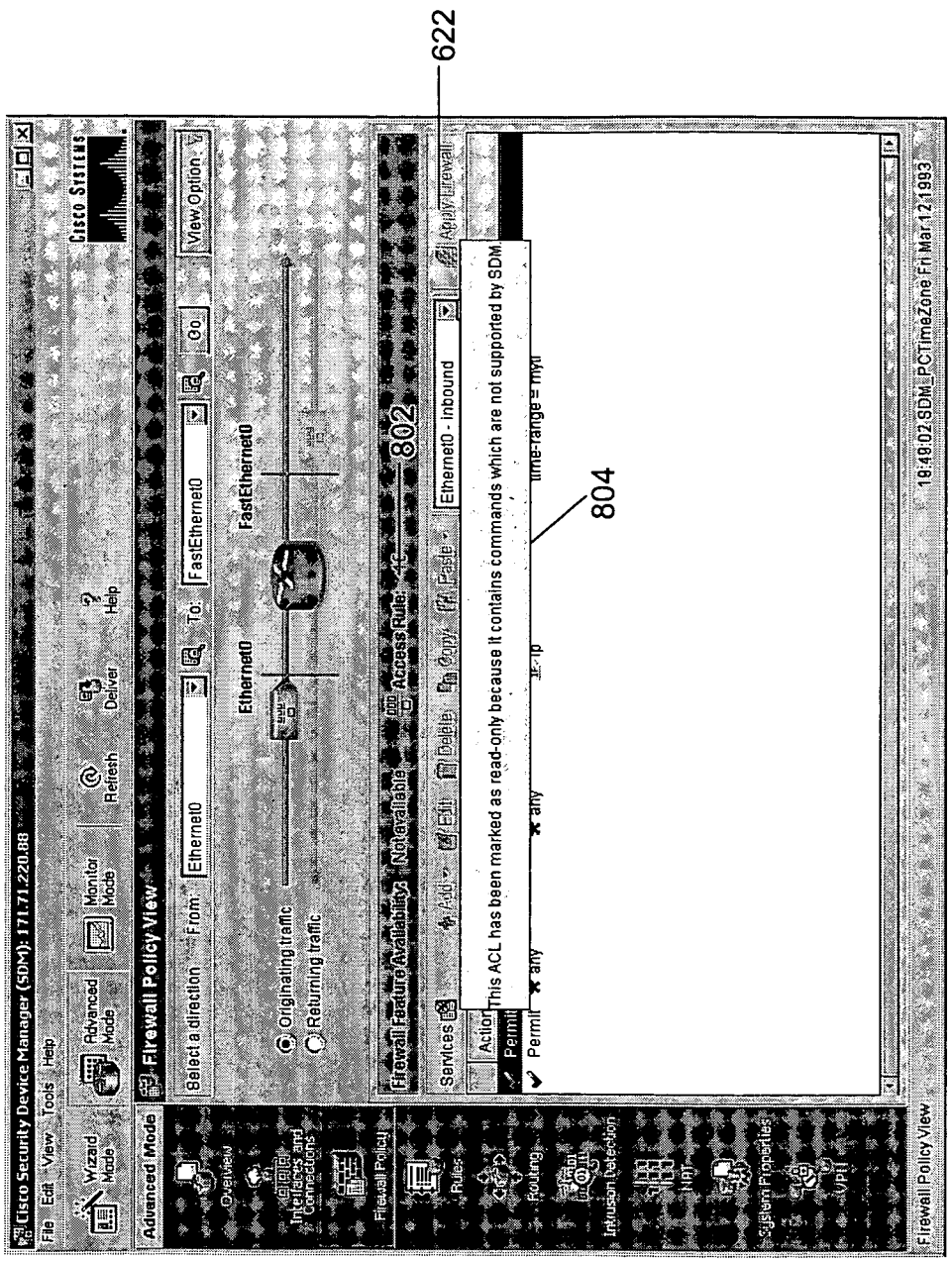
FIG. 8 illustrates the display of an icon with a pop-up message when an ACL is not supported by the user interface, in accordance with an exemplary embodiment of the present invention.

Service panel 406 allows viewing of rule entries of a rule of a policy. For example, for the firewall policy rule ACL, rule entries such as access control entries (ACE) are displayed in service panel 406. Further, if ACEs that are not supported by user interface 500 are detected, the entire ACL is marked as read-only and displayed as a read-only icon. When this read-only icon is pointed at, a message is communicated to the user. FIG. 8 illustrates display of a message when an ACE is not supported by user interface 500. FIG. 8 is described later.

Application panel 408 includes an application panel toolbar 628. Application panel toolbar 628 includes buttons that enable the user to view, create, modify, delete, and manage rules of a policy, for example CBAC rules. Application panel toolbar 628 includes a warning and error message indicator, which is visible in case of a warning or error condition.

FIG. 7 illustrates screenshot 600 when there is only one configured interface in a device. In FIG. 7, the 'To' interface has not been selected from list 604.

FIG. 8 illustrates display of a message 804 when a rule of a policy, for example an ACL, is not supported by user interface 500. It can be seen from FIG. 8 that the CBAC policy is not available on the corresponding device and hence, application panel 408 is hidden. In such a condition, a user is not able to configure firewall, but the user can configure ACL to control the traffic flow. An ACL icon 802 indicates the ACL. If the ACL has unsupported ACEs, it is marked as read-only and a read-only icon is displayed on the service panel toolbar 622. In such a scenario, when a mouse indicator points to ACL icon 802, a popup window displays message 804. Message 804 shows the reason for marking the ACL as read-only. During such a read-only condition, service panel toolbar 622 is disabled and application panel 408 is not displayed.

Figure 9:
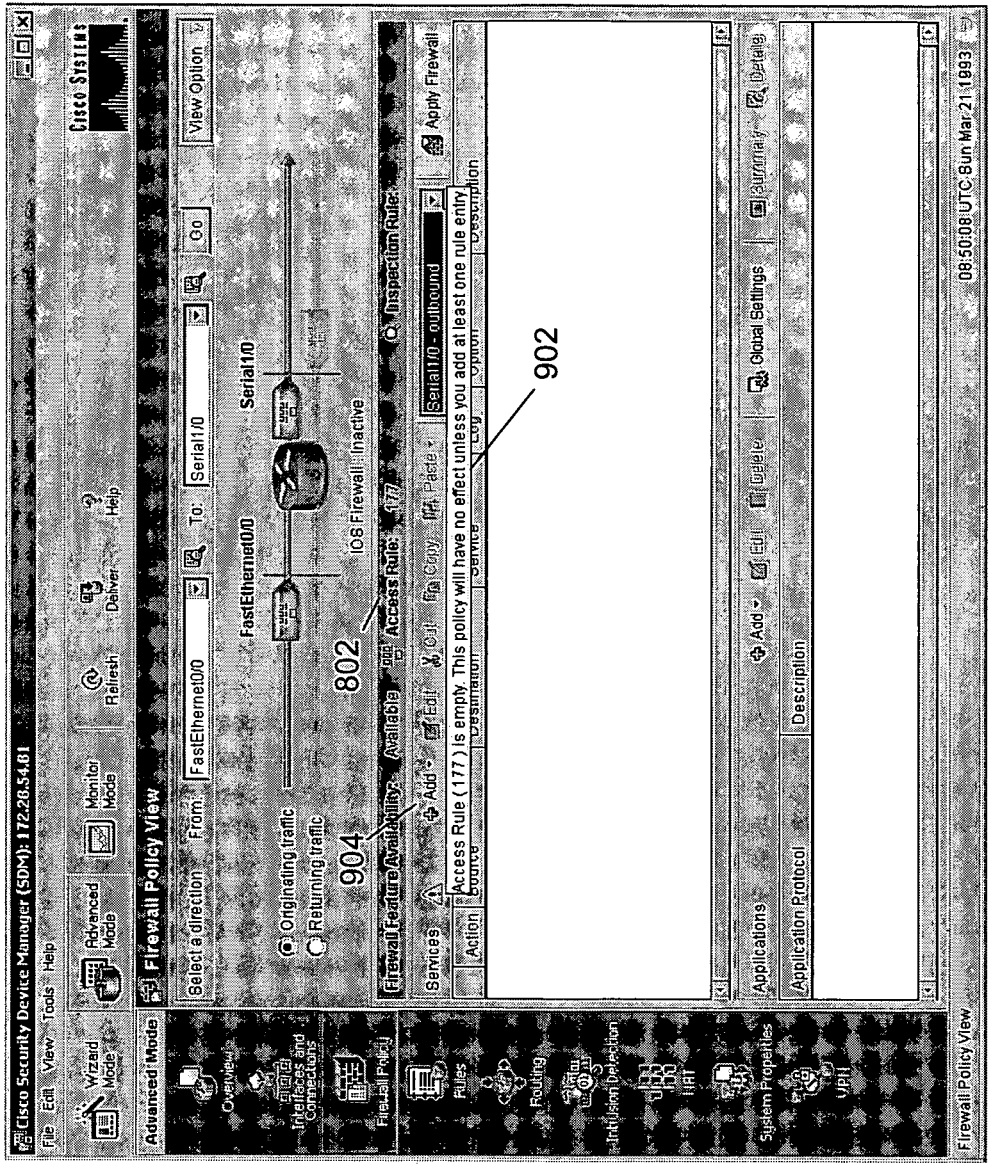
FIG. 9 illustrates the display of a warning message in case of an empty rule of a policy, in accordance with an exemplary embodiment of the present invention.

FIG. 9 illustrates display of a warning message in case of an empty rule of a policy—for example, if there are no rule entries (ACEs) in an ACL and the ACL is associated with an interface in a specific direction. When a user selects an ACL such that the ACL does not include any ACE, an ACL icon 902 is displayed. On pointing at ACL icon 902, a warning message is displayed indicating that there are no ACEs for the selected ACL. For such a case, the user can add new ACEs by using an 'Add' button 904 of service panel toolbar 622.

Figure 10A:
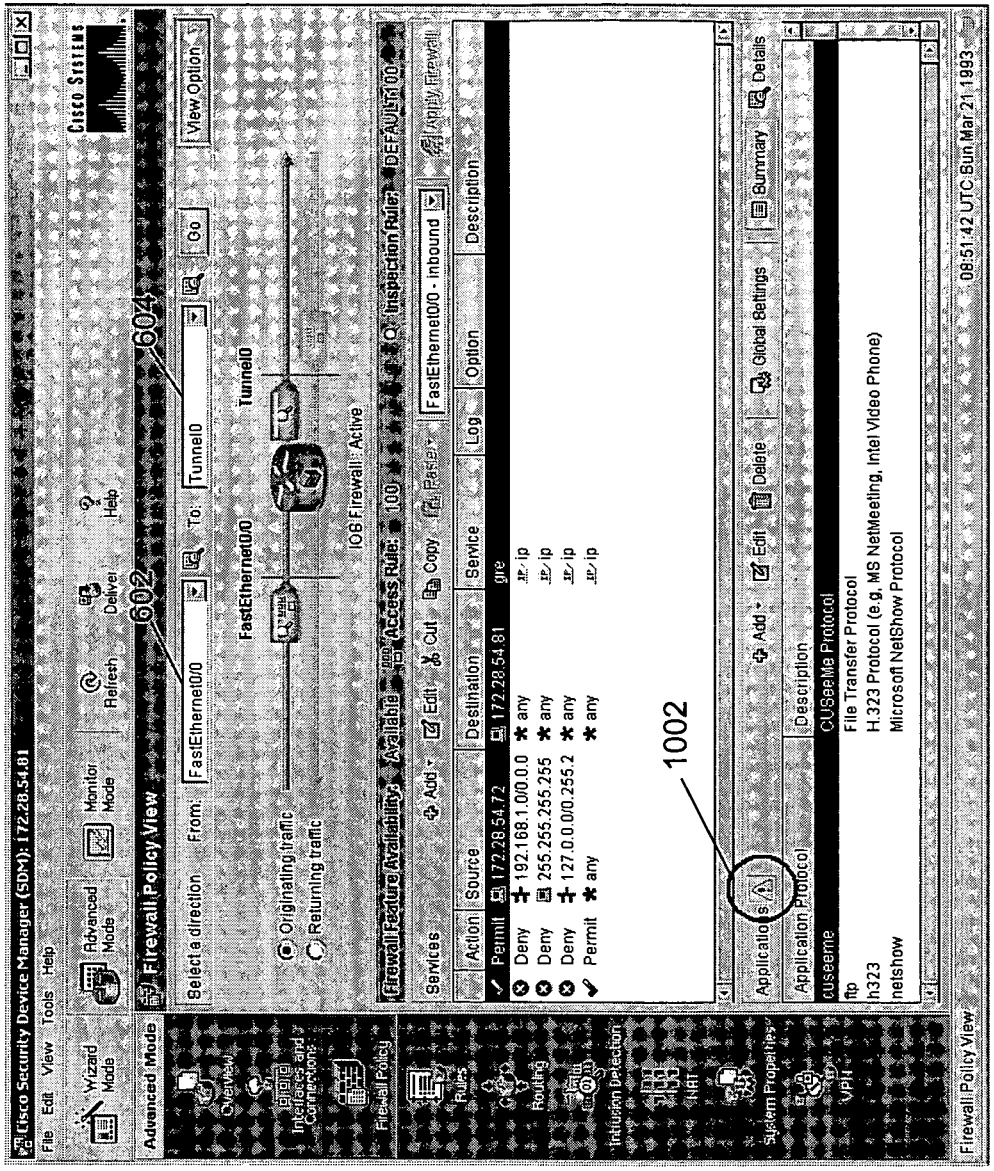
FIG. 10A illustrates the display of a warning icon, in accordance with an exemplary embodiment of the present invention.
Figure 10B:
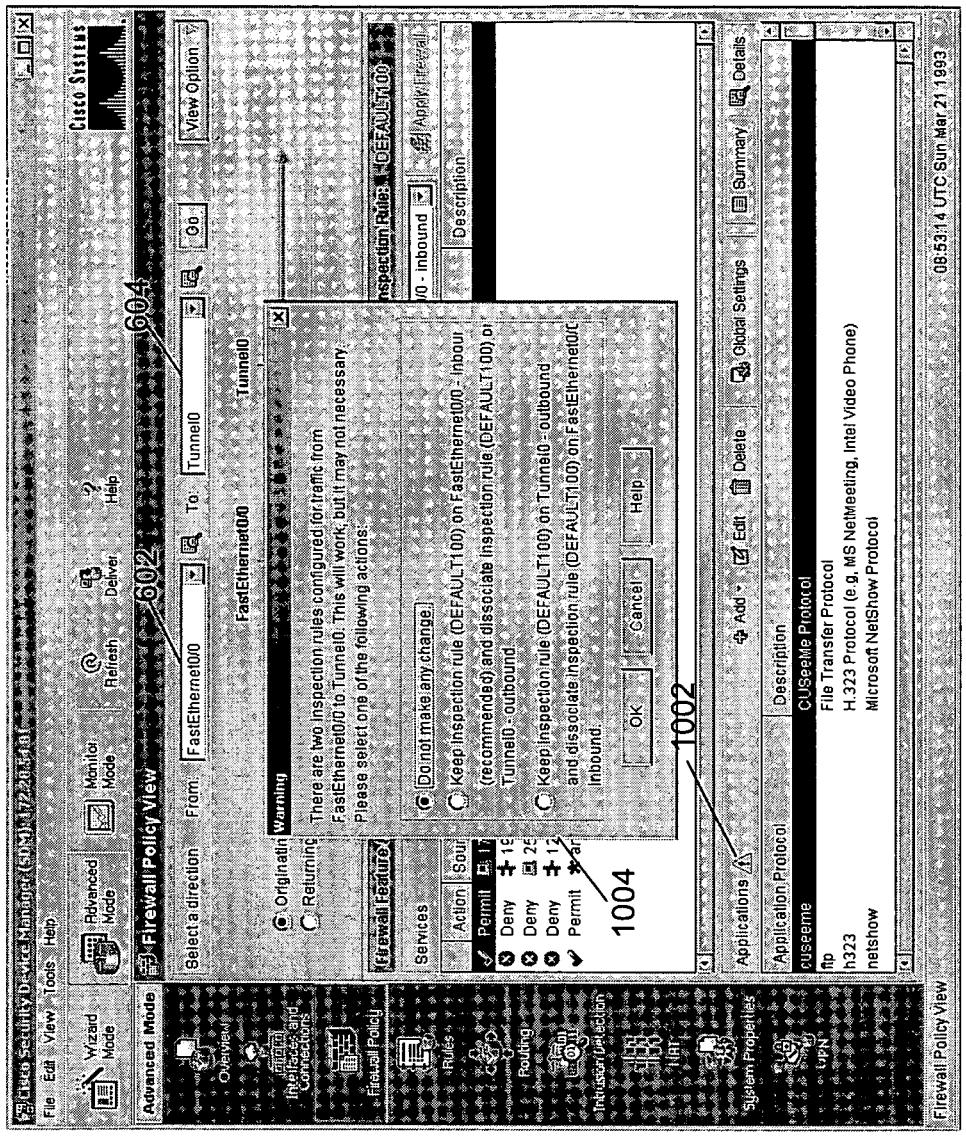
FIG. 10B illustrates the display of a warning message, corresponding to the warning icon of FIG. 10A.

FIG. 10A illustrates the display of a warning icon for CBAC rule configuration. For example, there may be two CBAC rules configured for traffic from 'From' interface to 'To' interface. A warning icon 1002 is then displayed. When warning icon 1002 is clicked, a dialog box is generated for displaying reasons for the warning and providing suggested actions. FIG. 10B illustrates the display of a warning message 1004 corresponding to warning icon 1002 of FIG. 10A. The dialog box includes radio buttons that allow the user to choose appropriate action.

Figure 11:
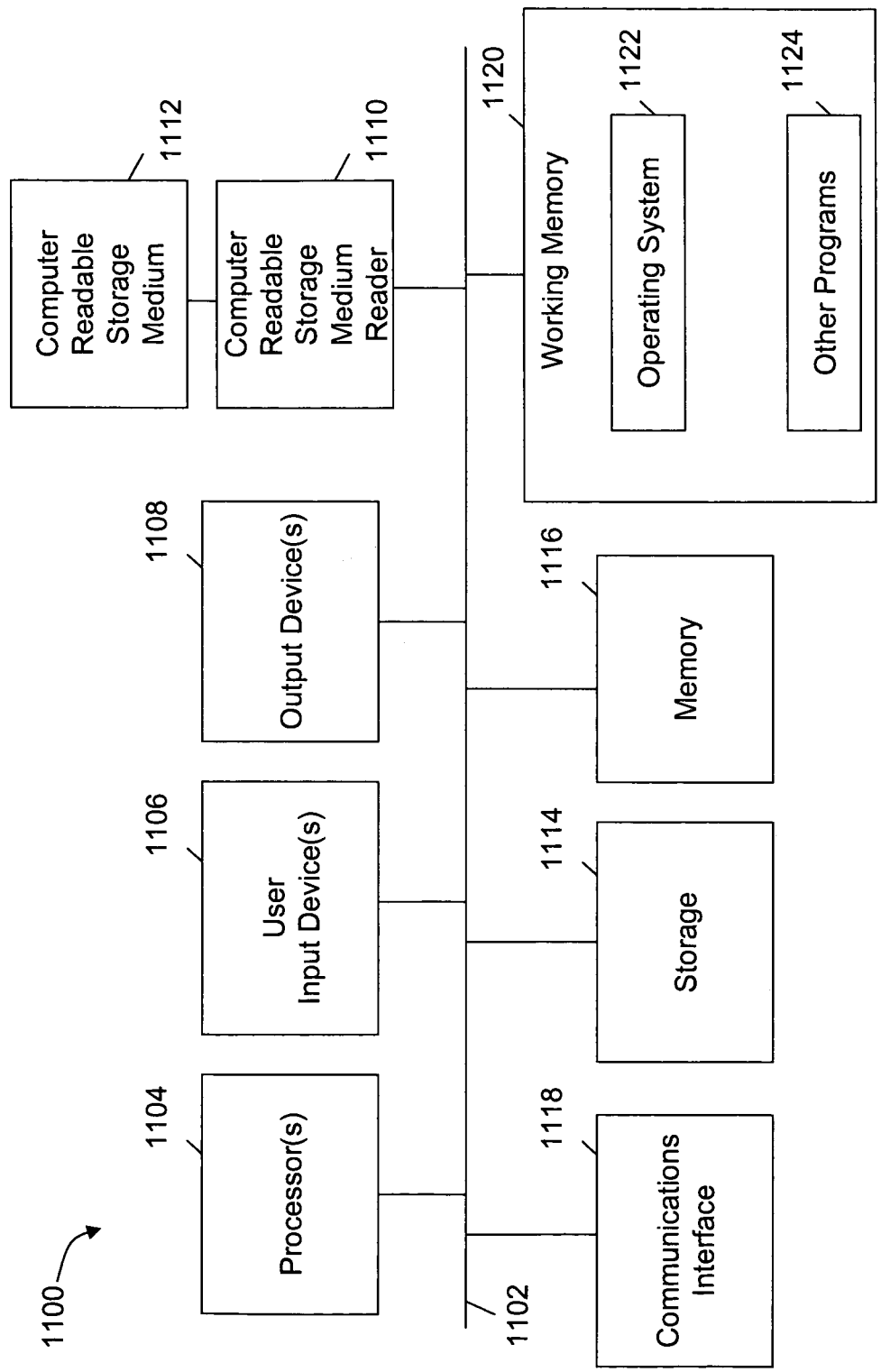
FIG. 11 illustrates an exemplary computing system, in accordance with an exemplary embodiment of the present invention.

The user interface of the invention resides in a processor system as mentioned earlier. The processor system is part of a computing system. FIG. 11 illustrates an exemplary computing system, according to an exemplary embodiment of the present invention. A computing system 1100 comprises components coupled via one or more communication channels (e.g. a bus 1102) including one or more general or special purpose processors 1104, such as a Pentium®, Centrino®, Power PC®, digital signal processor ('DSP'), and so on. Computing system 1100 also includes one or more user input devices 1106 (such as a mouse, keyboard, microphone, pen, and so on), and one or more output devices 1108, such as a suitable display, speakers, actuators, and so on, in accordance with a particular application. Computing system 1100 also includes a computer readable storage media reader 1110 coupled to a computer readable storage medium 1112, such as a storage/memory device or hard or removable storage/memory media; such devices or media are further indicated separately as a storage 1114 and a memory 1116, which can include hard disk variants, floppy/compact disk variants, digital versatile disk (DVD) variants, smart cards, partially or fully hardened removable media, read only memory, random access memory, cache memory, and so on, in accordance with the requirements of a particular application.

One or more suitable communication interfaces 1118 can also be included, such as a modem, DSL, infrared, RF or other suitable transceiver, and so on for providing inter-device communication directly or via one or more suitable private or public networks or other components that can include but are not limited to those already discussed. A working memory 1120 further includes an operating system (OS) 1122. Working memory 1120 can also include one or more of application programs, mobile code, data, and so on for implementing the elements of the user interface as described in FIG. 4 and FIG. 5 that might be stored or loaded therein during use. The type of OS 1122 can vary in accordance with a particular device, feature, or any other aspect in accordance with a particular application (e.g. Windows, WindowsCE, Mac, Linux, Unix, or Palm OS variants, a cell phone OS, a proprietary OS, and so on). Various programming languages or other tools may also be utilized, such as those compatible with C variants (e.g., C++, C#), the Java 2 Platform, Enterprise Edition (J2EE) or other programming languages in accordance with the requirements of a particular application. Such working memory components can, for example, include one or more of applications, add-ons, applets, custom software, and so on for conducting but not limited to the examples discussed elsewhere herein. Other programs 1124 may, for example, include one or more of the aforementioned security, compression, synchronization, backup systems, Web browsers, conferencing programs, education programs, groupware code, and so on, including but not limited to those discussed elsewhere herein.

Embodiments of the present invention have the advantage that they allow a user to visualize and identify different policies and their associations with interfaces. Further, changes can be made in the policies, if required. It also allows easy switching of traffic flow direction with a single click. The invention allows display of relationships between the traffic flow (sources, destinations and services), interfaces, and direction of traffic flow, policies and associations in a two-dimensional or three-dimensional diagram. To summarize, the invention allows a user to get a snapshot of policies applied to the traffic flow between any two interfaces.

Although the invention has been discussed with respect to specific embodiments thereof, these embodiments are merely illustrative, and not restrictive, of the invention. For example, a 'method for managing policy configuration' can include any type of analysis, manual or automatic, to anticipate the needs of network traffic through a device in a network at a time of network operation.

Although specific protocols have been used to describe embodiments, other embodiments can use other transmission protocols or standards. The present invention can operate between a client PC and a device or a network of devices. Use of the terms 'peer', 'client', and 'server' can include any type of device, operation, or other process. The present invention can also operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method executing in a processing system, the processing system including one or more processors, the method comprising:
    displaying a service panel, wherein the service panel indicates whether a particular traffic flow through a given interface is allowed or denied;
    displaying a policy diagram panel having a graphical network interface policy diagram including:
        a device icon, wherein the device icon corresponds to a device in a network, the device having a plurality of interfaces;
        a plurality of interface indicia icons associated with traffic flow through the plurality of interfaces and connected to the device icon; and
        a pair of traffic indicia icons that indicate a direction of traffic flow with respect to the plurality of interface indicia icons and the device icon, wherein each of the traffic indicia icons indicates a direction;
    receiving a signal from a user input device to indicate selection of an interface indicium icon from the plurality of interface indicia icons; and
    in response to receiving the signal from the user input device, rendering, on the graphical network interface policy diagram, at least one policy icon representing policy information of an interface represented by at least one of the interface indicia icons in accordance with the direction of traffic flow, the at least one policy icon positioned in relation to the at least one of the interface indicia icons representing the interface,
    wherein the steps above are implemented by the one or more processors.

2. The method of claim 1, wherein the plurality of interface indicia icons include first and second interface indicia icons, wherein the first interface indicia icons are ingress of traffic flow to the device, and wherein the second interface indicia icons are egress of traffic flow from the device.

3. The method of claim 1, wherein the pair of traffic indicia icons includes displaying first and second traffic indicia icons, wherein the first traffic indicium icon indicates a traffic flow in a first direction with respect to individual ones of the plurality of interface indicia icons and to the icon, and wherein the second traffic indicium icon indicates a traffic flow in a different direction from the first direction.

4. The method of claim 3, further comprising receiving a selection of a traffic indicium icon corresponding to a direction from a user input device.

5. The method of claim 4, further comprising in response to the selection of the traffic indicium icon swapping the interface indicia icons to alter the indicated direction of traffic flow.

6. The method of claim 1, further comprising:
    in response to receiving the signal from the user input device, displaying, in a policy table, policy information of an interface associated with the interface indicium in accordance with the direction of traffic flow; and
    identifying the policies applicable at the interfaces.

7. The method of claim 6, wherein identifying the policies includes synchronizing the display and updating the policies applicable at the interfaces.

8. The method of claim 6, wherein displaying policy information further comprises displaying rule entries corresponding to each rule of a policy applied at the interfaces.

9. The method of claim 8, wherein displaying the rules for an inbound traffic flow are given higher priority than displaying the rules for an outbound traffic flow.

10. The method of claim 1, wherein displaying policy information comprises displaying an icon for every rule of each policy applied at the interfaces.

11. The method of claim 10, wherein a policy is applied when the traffic flow reaches an interface ingress of the traffic flow to the device, or, when the traffic flow reaches an interface egress of the traffic flow from the device.

12. The method of claim 1 further comprising displaying warning messages when the policy applied at interface ingress of the traffic flow to the device is not compatible with the policy applied at the interface egress of the traffic flow to the device.

13. The method of claim 12 further comprising accepting a signal from the user input device to allow a user to select a new policy.

14. The method of claim 1 further comprising accepting a signal from the user input device to allow a user to create a new policy.

15. The method of claim 1 further comprising displaying services, protocols and applications associated with the interfaces.

16. The method of claim 1, wherein the method is applicable for displaying multiple policies.

17. The method of claim 16, wherein the method is applicable to a plurality of layers, each layer displaying a policy applicable at the interfaces.

18. A user interface including a processing system, the processing system including one or more processors, the user interface comprising:
- a service panel for indicating whether a particular traffic flow through a given interface is allowed;
- a policy diagram panel having a graphical network interface policy diagram for rendering:
  - a device icon corresponding to a device in a network, the device having a plurality of interfaces,
  - a plurality of interface indicia icons associated with traffic flow through the plurality of interfaces and connected to the device icon,
  - a pair of traffic indicia icons that indicate a direction of traffic flow with respect to the plurality of interface indicia icons and the device icon, wherein each of the traffic indicia icons indicates a direction, and
  - at least one policy icon representing policy information of an interface represented by at least one of the interface indicia icons in accordance with the direction of traffic flow, the at least one policy icon positioned in relation to the at least one of the interface indicia icons representing the interface;
- a policy controller for accepting a signal from a user input device to indicate selection of an interface indicium icon from the plurality of interface indicia icons; and
- a policy table for displaying, in response to the signal from the user input device, policy information of an interface associated with the interface indicium in accordance with the direction of traffic flow,
- wherein the elements above are implemented by the one or more processors.

19. The user interface of claim 18, wherein the user interface further comprises a traffic selection panel for selecting a pair of interfaces corresponding to a pair of interface indicia icons and indicating a direction of traffic flow with respect to the pair of interface indicia icons and to the device icon.

20. The user interface of claim 18, wherein the traffic selection panel allows a user to preview the details of a selected interface indicium icon.

21. The user interface of claim 18, wherein the policy table comprises an application panel for listing rules corresponding to a policy applied at the interfaces.

22. The user interface of claim 18, further comprising means for displaying warning messages if the rules corresponding to a policy are not supported by the user interface.

23. The user interface of claim 18, wherein the policy controller coordinates the synchronization between the policy diagram panel and policy table.

24. The user interface of claim 23, wherein the policy controller further controls updating and an order of displaying the policies displayed in the policy diagram panel and policy table.

25. An apparatus comprising:
- a processing system including one or more processors coupled to a display and user input device; and
- one or more non-transient computer readable storage devices including instructions executable by the one or more processors comprising:
  - one or more instructions for displaying a service panel, wherein the service panel indicates whether a particular traffic flow through a given interface is allowed or denied;
  - one or more instructions for displaying a policy diagram panel having a graphical network interface policy diagram including:
    - a device icon, wherein the device icon corresponds to a device in a network, the device having a plurality of interfaces;
    - a plurality of interface indicia icons associated with traffic flow through the plurality of interfaces and connected to the device icon; and
    - a pair of traffic indicia icons that indicate a direction of traffic flow with respect to the plurality of interface indicia icons and the device icon, wherein each of the traffic indicia icons indicates a direction;
  - one or more instructions for receiving a signal from a user input device to indicate selection of an interface indicium icon from the plurality of interface indicia icons; and
  - one or more instructions for rendering, on the graphical network interface policy diagram in response to receiving the signal from the user input device, at least one policy icons representing policy information of an interface represented by at least one of the interface indicia icons indicium in accordance with the direction of traffic flow, the at least one policy icon positioned in relation to the at least one of the interface indicia icons representing the interface,
  - wherein the steps above are implemented by the one or more processors.

26. A non-transitory computer readable storage medium including instructions executable by a processor comprising:
- one or more instructions for displaying a service panel, wherein the service panel indicates whether a particular traffic flow through a given interface is allowed or denied;
- one or more instructions for displaying a policy diagram panel having a graphical network interface policy diagram including:
  - a device icon, wherein the device icon corresponds to a device in a network, the device having a plurality of interfaces,
  - a plurality of interface indicia icons associated with traffic flow through the plurality of interfaces and connected to the device icon; and
  - a pair of traffic indicia icons that indicate a direction of traffic flow with respect to the plurality of interface indicia icons and the device icon, wherein each of the traffic indicia icons indicates a direction;
- one or more instructions for receiving a signal from a user input device to indicate selection of an interface indicium icon from the plurality of interface indicia icons; and
- one or more instructions for rendering, on the graphical network interface policy diagram in response to receiving the signal from the user input device, at least one policy icons representing policy information of an interface represented by at least one of the interface indicia icons in accordance with the direction of traffic flow, the at least one policy icon positioned in relation to the at least one of the interface indicia icons representing the interface,
- wherein the steps above are implemented by the one or more processors.

27. A method executing in a processing system, the processing system including one or more processors, the method comprising:
- displaying a service panel, wherein the service panel indicates whether a particular traffic flow through a given interface is allowed or denied;
- displaying a policy diagram panel having a graphical network interface policy diagram including:

a device icon, wherein the device icon corresponds to a device in a network, the device having a plurality of interfaces, a plurality of interface indicia icons associated with traffic flow through the plurality of interfaces and connected to the device icon, a pair of traffic indicia icons that indicate a direction of traffic flow with respect to the plurality of interface indicia icons and the device icon, wherein each of the traffic indicia icons indicates a direction, and at least one policy icon representing policy information of an interface represented by at least one of the interface indicia icons in accordance with the direction of traffic flow, the at least one policy icon positioned in relation to the at least one of the interface indicia icons representing the interface;

receiving a signal from a user input device to indicate selection of an interface indicium icon from the plurality of interface indicia icons; and in response to receiving the signal from the user input device, displaying, in a policy table, policy information of an interface associated with the interface indicium in accordance with the direction of traffic flow, wherein the steps above are implemented by the one or more processors.

28. The method of claim 27, further comprising;

selecting a first interface indicia icon as the ingress of a traffic flow;

selecting a second interface indicia icon as the egress of the traffic flow;

applying policy information as ingress at the first interface indicia icon; and applying policy information as egress at the second interface indicia icon.

29. The method of claim 27, further comprising altering the indicated flow of traffic.

30. The method of claim 29 wherein said altering the flow of traffic comprises swapping the first interface indicia icon for the second interface indicia icon.

31. The method of claim 27, wherein the traffic indicia icons include first and second traffic indicia icons, wherein the first traffic indicium icon indicates a traffic flow in a first direction with respect to the first and second interface indicia and to the device icon, and wherein the second traffic indicia indicium icon indicates a traffic flow in a different direction from the first direction.

32. The method of claim 31, further comprising receiving a signal from a user input device indicating a user selection of a traffic indicia icon corresponding to a direction; and in response to the user selection, swapping the interface indicia icons to alter the indicated direction of traffic flow.

* * * * *